D. C. BROWN.

Harness for Looms.

No. 9,220 Reissued May 25, 1880.

Witnesses.

Jos. P. Livermore.

L. F. Connor

Inventor.

Darius C. Brown by Crosby & Gregory

Attys

UNITED STATES PATENT OFFICE.

DARIUS C. BROWN, OF LOWELL, MASSACHUSETTS.

HARNESS FOR LOOMS.

SPECIFICATION forming part of Reissued Letters Patent No. 9,220, dated May 25, 1880.

Original No. 72,967, dated January 7, 1868. Application for reissue filed December 4, 1879.

*To all whom it may concern:*

Be it known that I, DARIUS C. BROWN, of Lowell, Middlesex county, Massachusetts, have invented a new and useful Improvement in Harness-Frames for Looms; and I hereby declare that the following is a full, clear, and exact description thereof, which will enable others skilled in the art to make and use the same, reference being had to the accompanying drawings, forming part of this specification.

This invention relates to the hanging of the heddles in and to their frame; and it consists in hanging the series of heddles at one end, which I prefer should be the upper, upon a common rod or bar of the harness-frame, but at their opposite or lower ends, alternately and in regular order, upon two bars or rods secured in and to the frame in planes parallel to and a short distance from each other, whereby in the same width of harness-frames more heddles can be hung than when hung in the ordinary manner—an advantage of much importance, such arrangement of the heddles insuring the perfect drawing off of the heddles by the drawer or operator to form the lease.

My invention also has for its object such a construction of harness-frame, as hereinafter described, that the heddle-holding bars may be retained in place in the side bars of the frame without the employment of hooks, bolts, screws, or rivets, as heretofore considered necessary.

In this my frame the front and rear sides and ends of the frame present smooth surfaces, so there is no liability of the heddle-frame being caught and held. My heddle-bars are fitted into pockets made at the inner edges of the side bars of the heddle-frame, the said pockets being so shaped and located with relation to the length of the heddle-bar, the width of the space between the inner edges of the side bars, and the width of the said side bars themselves that the pockets which receive the ends of the heddle-bars shall act as stops for the ends of the heddle-bars, the latter being inserted in place within the said pockets or being removed by flexing or bending them.

Figure 2:
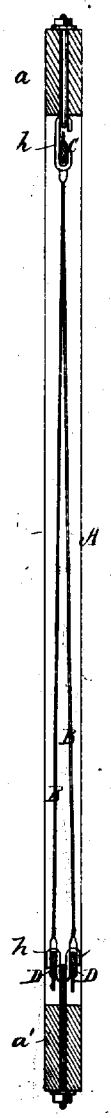
Figure 1:
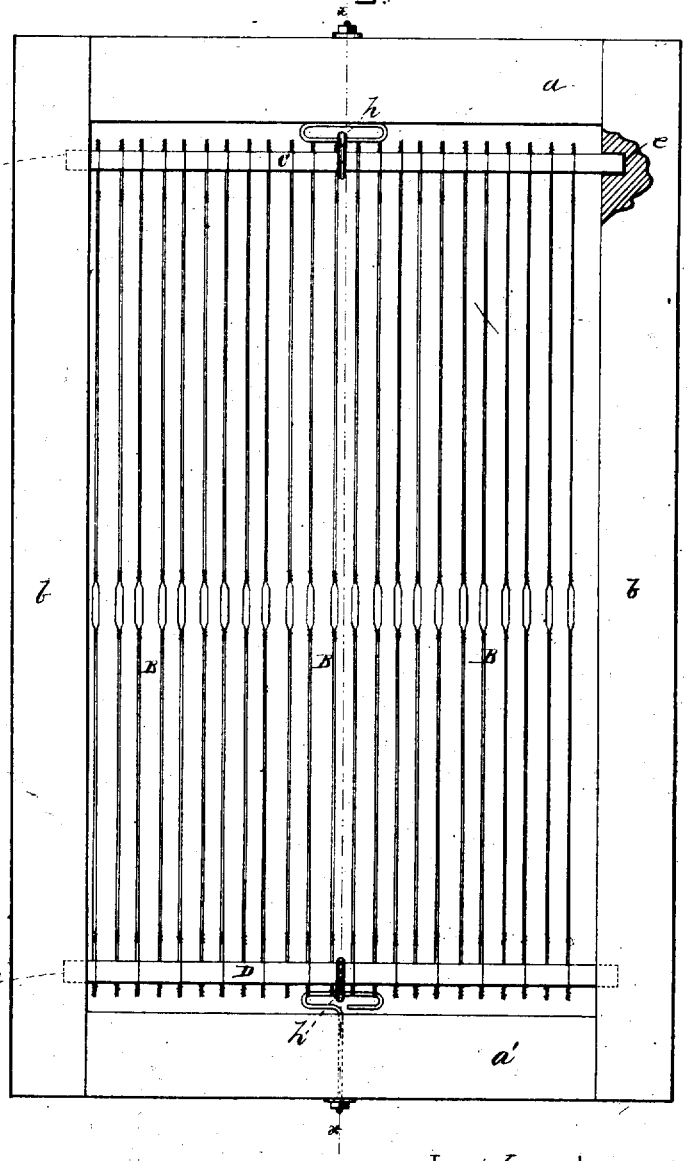

Figure 1 is a front view of a harness-frame having its heddles hung in accordance with my invention, and having a portion of the upper right-hand corner in section to show one of the pockets to receive the heddle-bar, the other pockets being indicated in dotted lines; and Fig. 2, a transverse vertical section taken in the plane of the line *x x*, Fig. 1.

Similar letters of reference indicate corresponding parts.

A in the drawings represents the harness-frame, and B its heddles, the number of which may be more or less, as may be desired. These heddles B are hung at their upper ends to a common rod or bar, C, secured in the upper end of the harness-frame, but at their lower ends are alternately hung, in regular order and succession, to and upon two or more parallel bars, D, secured in such end of the harness-frame, these bars being placed at a short distance from each other and the one back of the other.

By hanging the heddles in the manner above explained it is plainly obvious that a great amount of space or room is given to the heddle-eyes, thus enabling a larger number of them to be used than by the old method of hanging, and that, furthermore, the perfect drawing of the heddles for forming the lease is insured, as, if a wrong heddle is taken in hand by the drawer, it is stopped by the one before it, owing to its being hung upon a different bar or rod at its lower end.

The harness-frame is composed of top and bottom bars, *a a'*, and side bars, *b*, having short pockets *c* cut into the inner edges, as shown in Fig. 1. These pockets, one of which is broken out, as shown at the right of Fig. 1, receive in them the ends of the heddle-bars C D, they being of spring metal, and being curved, flexed, or sprung in order to insert them into the said pockets. The ends of the pockets serve as stops for the ends of the said bars, so that simple longitudinal movement of either of the said bars will not remove either of its ends from either of the pockets.

In practice the heddle-bars are longer than the distance between the inner edges of the side bars, *b b*, and shorter than the distance from the outer edge of one side bar to the outer edge of the other side bar. Consequently the ends of the heddle-bars, when in position to hold the heddles, terminate within the pockets in the side bars, where they are prevented from escaping, unless the heddle-bars are flexed, sprung, or curved laterally, such curving of the bars permitting their ends to be withdrawn from the pockets.

The heddle-bars between the side bars of the harness-frame are supported by rod-hooks *h*, adjustably attached to the top and bottom bars, *a a'*, which, besides keeping the heddle-bars at the proper distances from each other to correctly hold the heddles, also brace the heddle-bars between their ends and prevent such accidental strain or flexure which would draw the ends of the bars from their pockets.

To place a heddle-bar in position, insert one of its ends in one pocket, then flex or spring the bar centrally, place its other end at the mouth of the pocket to receive the opposite end of the bar, and let the bar assume its straight-line position, which will cause the then free end of the said bar to enter the said pocket. This done, the bars are engaged by the rod-hooks, that hold the bars centrally.

I claim as new and desire to secure by Letters Patent—

1. A loom-harness provided with heddles hung at one end to a bar common to all and at their opposite ends to two or more bars, substantially as and for the purpose specified.

2. As an improved article of manufacture, the harness-frame having side bars, *b b*, provided at their inner edges with pockets, combined with metallic heddle-bars, the ends of which rest freely in the said pockets, the heddle-bars being longer than the distance between the inner edges of the said side bars and shorter than the distance between the outer edges of the said bars, the said pockets holding the heddle-bars in place, all substantially as set forth.

DARIUS C. BROWN.

Witnesses:
G. W. GREGORY,
L. F. CONNOR.